Dec. 17, 1940.  A. W. FRANKLIN  2,225,472
BUSHING
Filed Jan. 27, 1940

ALBERT W. FRANKLIN, INVENTOR.

BY Jacob D. Levit

ATTORNEY.

Patented Dec. 17, 1940

2,225,472

UNITED STATES PATENT OFFICE 2,225,472

BUSHING

Albert W. Franklin, New York, N. Y.

Application January 27, 1940, Serial No. 315,954

6 Claims. (Cl. 173—322)

My invention relates to a type of bushing known as a grommet for cables, rods and the like.

The particular object of my invention is to provide an improved bushing and strain relief for an electric cable.

In the connection of an electric cable to a radio instrument or the like, it is necessary to provide a relief and bushing so that a strain placed on the cable will not be transmitted to the instrument to which the cable is connected, and also so that the cable insulation will not be injured by rubbing against the opening through which it passes. It has been an early practice to provide this strain relief by knotting the cord or cable on both sides of the plate through which it passes. To make these knots expertly, so that the cord cannot be pulled in either direction, is a difficult practice, and the result is not always satisfactory. A recent development in the art provides for the grommet to be molded or glued onto the cable. From an operating standard, this is satisfactory, but from the production point of view, especially if the grommet is cast onto the cable, it means that the cables must first be cut to the desired length, which makes production slow, cumbersome and relatively expensive.

The principal feature in the present invention resides in providing a bushing of resilient material, having an axial hole to permit the insertion of a cable therethrough; on the side of the bushing, opposite to the direction of the "pull," the hole through which the cable passes is reduced in cross-section to less than the cross-section of the cable. When the pull is applied to the cable, the friction existing between the cable and the bushing tends to draw the material of the bushing inwardly through the hole along with the cable. The effect can be described as a tendency to turn the bushing inside out. As the bushing continues to turn inwardly and more of its material is pulled into the hole, the pressure between the bushing and cable increases until the two are frictionally bound together, the degree of bond depending upon the coefficient of friction between the two materials and the particular design of the bushing.

Another feature of this invention resides in providing a split bushing, similar in action to the above described, so that instead of first inserting the cable through the central hole and then sliding the bushing to the desired place, the bushing can first be wrapped around the cable directly where wanted.

Figure 1:
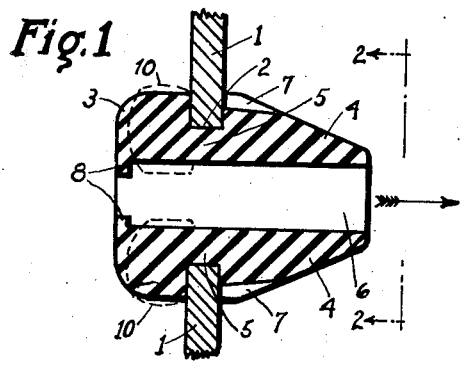
Figure 2:
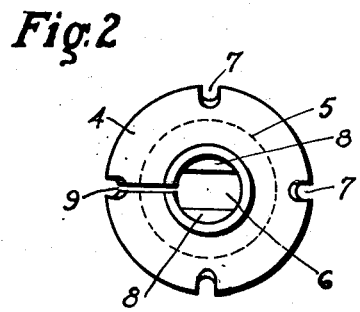
Figure 3:
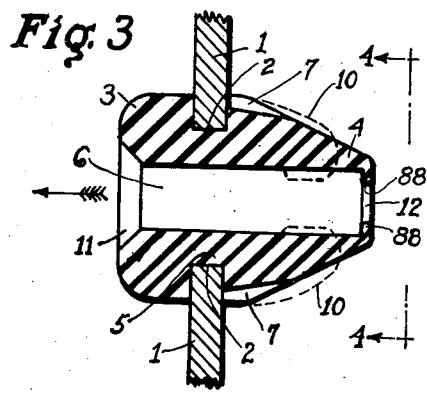
Figure 4:
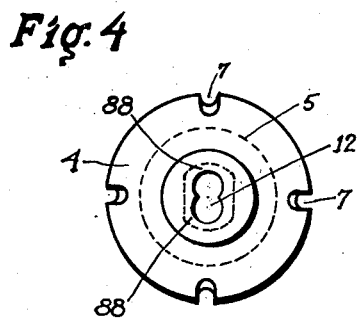
Figure 5:
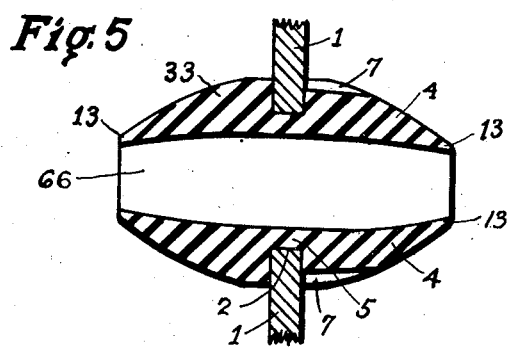

Other and further objects and features will become apparent from the following description and drawing in which like numerals of reference refer to identical parts, and in which: Fig. 1 is a cross-section of an embodiment of my invention; Fig. 2 is a view of Fig. 1 taken along line 2—2 of Fig. 1; Fig. 3 is a cross-section of the preferred form of the bushing; Fig. 4 is a view of Fig. 3 taken along line 4—4 of Fig. 3; Fig. 5 is a barrel-shaped embodiment of the bushing; and Fig. 6 is a cross-sectional view of the device shown in Fig. 1 with a wire drawn therethrough.

In the drawing, 1 represents the framework or chassis, in section, and 2 the hole through which the cable is to pass. In Fig. 1, the bushing is made of a conic mass of resilient material, such as rubber, divided into a front portion 3 and a rear portion 4 by a peripheral recess forming the neck 5. The diameters of hole 2 and neck 5 are substantially the same. The bushing is provided with an axial hole 6 of a cross-section substantially the same as the cable or the wire it is to protect. From the face of front portion 3, extending into the area of the axial opening 6, are lips 8. The bushing is split lengthwise by cut 9 (Fig. 2) so that it can be unfolded.

The bushing or grommet is used in the following manner: The bushing is wrapped around the cable at the desired point with portion 4 pointing in the direction (indicated by the arrow) from which the tension on the cable is to be applied. Cable and bushing are then inserted into hole 2, portion 4 foremost, and the bushing is forced into said hole until it coincides with neck 5. To facilitate the entry of the bushing into hole 2, rear portion 4 is shaped like the frustum of a cone and is provided with external longitudinal recess 7 to receive the displaced material of the bushing as it is compressed to enter the hole 2. Now, if a pull is exerted on the cable enclosed within hole 6, the cable will tend to slide relative to the main portion of the bushing, but not with respect to lips 8. Lips 8 were slightly displaced to allow the cable to lie in hole 6. Because of the pressure and the high coefficient of friction between lips 8 and the cable, lips 8 will move with the cable, and are thus drawn inwardly into hole 6. As lips 8 are drawn further inwardly, they drag along the material comprising the front portion of the bushing, and, as this proceeds, the pressure and frictional resistance between lips and cable increases. Finally, the frictional resistance to further movement of the cable is taken up by the front portion of the bushing itself and is transmitted to framework 1. The dashed lines 10 in Figs. 1 and 3 indicate approximately the ultimate shape of the bushing. The amount of pull this bushing can resist depends entirely upon the material of which it is made and the relative depth of the annular recess at neck 5.

Figure 6:
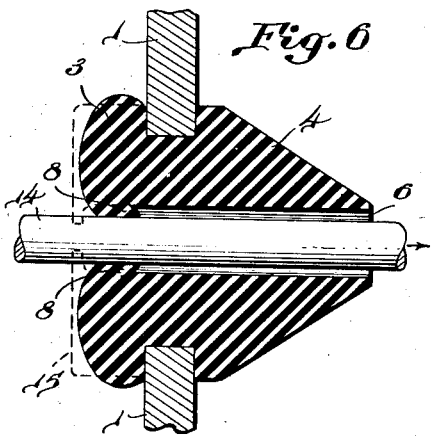

In Fig. 6, Fig. 1 is reproduced, and an attempt is made to illustrate the distortion induced in the grommet when in use as a strain relief device. The wire 14 has been introduced into hole 6 in the direction of the arrow and lips 8 have been drawn inwardly into said hole along with the wire. The bushing is shown distorted. The normal shape of the bushing at the lip face is represented by the dashed lines 15.

In Fig. 3 is illustrated a modification of the grommet just described. As before, it has a front portion 3, a rear portion 4, an annular recess at neck 5, an axial hole 6 and longitudinal flutings 7. This bushing is not split, and lips 88 are situated at the free face of the rear portion 4. The effectiveness of lips 88 is increased over the lips 8 of Fig. 1 in that, besides defining an area less than the cross-section of the cable to be inclosed, the shape of this area 12 (see Fig. 4) is parallel in contour to said cable so that more complete contact is made between lips and cable. The face of hole 6 in portion 3 is countersunk, shown by numeral 11, to facilitate the insertion of the cable into the grommet from that end. The grommet may be inserted into hole 2 either before or after it has received the cable. The action of this grommet is similar to that described for Fig. 1, the pull, however, being in the direction of the arrow shown on the figure, from rear to front.

In Fig. 5 is shown an embodiment of the invention which will resist a pull from either direction. Similar to the previous described devices, there is provided a front portion 33, rear portion 4, neck 5, axial hole 66 and external flutings 7 on the rear portion. Portion 33, except for recesses 7, is identical in shape to portion 4; both have the external shapes of frustums of cones each tapering to form a substantial feather edge 13, where they meet the bounding surface forming hole 66. Axial hole 66 has a cross-sectional area greater at its central portion and less at its ends than the area of the cable it is to inclose. This grommet is made with a longitudinal split, similar to split 9 described in connection with Figs. 1 and 2, so that it may be wrapped around the cable. Installed in a frame 1 and enclosing a cable, the grommet will resist a pull from either direction; feather edges 13 will act similar in manner to lips 8 and 88.

It should be obvious that the important element in this invention resides in the constricted openings of the axial hole in the bushing, and although the bushing is described as having a peripheral groove by means of which the bushing is attached to a base, other methods of attachment could be employed; further, lips 8 and 88 and feather edge 13 can be substituted for each other, or only one lip 8 or 88 could be used, and the bushing would still act in the same manner as described. Indeed, in the embodiments of Fig. 1 and Fig. 3 the bushing body has a thin edge of resilient material which is specifically a thin lip, extending at right angles to the body, towards the axis of aperture 6. In Fig. 5, the thin edge 13 is actually a lip, or point of a wedge, extending from the body of the bushing and inclined toward the axis of the aperture. Hence in all the embodiments the bushing body has a thin edge of resilient material which extends from the body towards the axis of the aperture.

Axial holes 6 and 66 may be larger in cross-sectional area than the area of the wire to be enclosed, and although in Figs. 1 and 3 these holes are illustrated as being of constant cross-section, this need not necessarily be so. Holes 6 may taper as hole 66 in Fig. 5, the requirement being that the cross-sectional area of these holes immediately adjacent their constricted portions at the face of the bushing be less than the sum of the cross-sectional areas of the wire to be admitted and of those portions lips 8, 88 or 13, as the case may be, first adapted to be drawn inwardly. In other words, the area of the holes behind the lips must be such that as the lips are drawn inwardly the wedging action, which eventually produces the frictional resistance to further motion, is assured.

From the foregoing description, it will be seen that I have provided simple, inexpensive and efficient means for carrying out the objects of my invention. While I have used the word cable in the description, it is to be understood that it includes wires and electric conduits. The grommet will also work as described, within limits, with flexible and non-flexible rods. It is therefore to be understood that the expression "wire" in the following claims is not limited to a flexible element or to an electric conductor, but is to be construed as a generic term to include cables, conduits, rope, rods both flexible and rigid, and other similarly shaped elements; nor is the term "wire" restricted to an element of circular cross-section. Furthermore, while I have particularly described the simplest elements adapted to perform the functions set forth, it is obvious that they could be subject to modifications, and variations in form, proportion and minor details of construction may be resorted to without departing from the spirit or sacrificing any of the principles of the invention.

What I claim is:

1. In combination with a wire element a bushing, the bushing comprising a body portion of resilient material adapted to be attached to a support and apertured to permit the insertion of the element therethrough, and a thin edge of resilient material extending toward the axis of said aperture from an end of said body portion and reducing the cross-sectional area of said aperture at said end to less than the cross-sectional area of the element, said thin edge of material being adapted to grasp the element when inserted and adapted to be drawn inwardly into the aperture with movement of the element inwardly with respect to the above mentioned end of the bushing, the cross-sectional area of a substantial portion of the aperture adjacent the said edge being less than the sum of the cross-sectional areas of the element and that portion of the edge first adapted to be drawn inwardly.

2. In combination with a wire element a bushing, the bushing comprising a body portion of resilient material adapted to be attached to a support and apertured to permit the insertion of the element therethrough, and a lip of resilient material extending toward the axis of said aperture from an end of said body portion and reducing the cross-sectional area of said aperture at said end to less than the cross-sectional area of the element, said lip of material being adapted to grasp the element when inserted and adapted to be drawn inwardly into the aperture with movement of the element inwardly with respect to the above mentioned end of the bushing, the cross-sectional area of a substantial portion of the aperture adjacent the said lip being less than the sum of the cross-sectional areas of the element and that portion of the lip material adapted to be drawn inwardly.

3. In combination with a wire element a bushing, the bushing comprising a body portion of resilient material adapted to be attached to a support and apertured to permit the insertion of the element therethrough, and a wedge of resilient material inclined toward the axis of said aperture from an end of said body portion and reducing the cross-sectional area of said aperture at said end to less than the cross-sectional area of the element, said wedge of material being adapted to grasp the element when inserted and adapted to be drawn inwardly into the aperture with movement of the element inwardly with respect to the above mentioned end of the bushing, the cross-sectional area of a substantial portion of the aperture adjacent the said wedge being less than the sum of the cross-sectional areas of the element and that portion of the wedge first adapted to be drawn inwardly.

4. In combination with a wire element a bushing, the bushing comprising a body portion of resilient material adapted to be attached to a support and apertured to permit the insertion of the element therethrough, and a wedge of resilient material inclined toward the axis of said aperture from each end of said body portion and reducing the cross-sectional area of said aperture at said ends to less than the cross-sectional area of the element, each wedge of material being adapted to grasp the element when inserted and adapted to be drawn inwardly into the aperture with movement of the element inwardly with respect to said wedge, the cross-sectional area of a substantial portion of the aperture adjacent each wedge being less than the sum of the cross-sectional areas of the element and that portion of the wedge first adapted to be drawn inwardly.

5. In combination with a wire element a bushing, the bushing comprising a body portion of resilient material adapted to be attached to a support and apertured to permit the insertion of the element therethrough, the opening of the aperture at a face of the bushing being constricted to less than the cross-sectional area of the element, the edge of said aperture at said face being adapted to grasp the element when inserted and adapted to be drawn inwardly into the aperture with movement of the element inwardly with respect to said face, the cross-sectional area of a substantial portion of the aperture adjacent the constricted opening being less than the sum of the cross-sectional areas of the element and that portion of the material at said edge first adapted to be drawn inwardly.

6. The combination comprising a wire element, a grommet of a resilient material, and a support for the grommet, the grommet being attached to the support and the wire element extending through the grommet in an aperture provided therein, the material of the grommet normally forming the edge of the aperture at a face of said grommet being turned inwardly into the aperture and there compressed between the wire element and the surface forming said aperture, the normal cross-sectional area of a substantial portion of the aperture adjacent said face being less than the sum of the cross-sectional areas of the wire element and the material of the grommet turned inwardly.

ALBERT W. FRANKLIN.